(12) United States Patent
Corradi et al.

(10) Patent No.: US 11,113,285 B2
(45) Date of Patent: Sep. 7, 2021

(54) PARTITION AWARE PARTIAL QUERY PROCESSING

(71) Applicant: SAP SE, Walldorf (DE)

(72) Inventors: Davide Corradi, Heidelberg (DE); Johannes Merx, Heidelberg (DE); Julian Schwing, Heidelberg (DE); Christoph Weyerhaeuser, Leimen (DE)

(73) Assignee: SAP SE, Walldorf (DE)

(*) Notice: Subject to any disclaimer, the term of this patent is extended or adjusted under 35 U.S.C. 154(b) by 261 days.

(21) Appl. No.: 15/945,022

(22) Filed: Apr. 4, 2018

(65) Prior Publication Data

US 2019/0311058 A1 Oct. 10, 2019

(51) Int. Cl.
*G06F 17/30* (2006.01)
*G06F 16/2455* (2019.01)
*G06F 16/22* (2019.01)
*G06F 16/2453* (2019.01)

(52) U.S. Cl.
CPC .... *G06F 16/24554* (2019.01); *G06F 16/2282* (2019.01); *G06F 16/24532* (2019.01); *G06F 16/24558* (2019.01); *G06F 16/24561* (2019.01)

(58) Field of Classification Search
CPC ......... G06F 17/30486; G06F 17/30495; G06F 17/30445; G06F 17/30339; G06F 17/30501; G06F 16/24532; G06F 16/24561; G06F 16/2282; G06F 16/24558; G06F 16/24554
See application file for complete search history.

(56) References Cited

U.S. PATENT DOCUMENTS

| | | | |
|---|---|---|---|
| 7,921,131 B2* | 4/2011 | Uppala | G06F 16/2471 707/770 |
| 9,471,610 B1* | 10/2016 | Long | G06F 16/2228 |
| 2006/0218123 A1* | 9/2006 | Chowdhuri | G06F 16/24532 |
| 2007/0250517 A1* | 10/2007 | Bestgen | G06F 16/22 |
| 2014/0122452 A1* | 5/2014 | Faerber | G06F 16/24561 707/693 |
| 2017/0255677 A1* | 9/2017 | Behnen | G06F 16/2456 |
| 2018/0089269 A1* | 3/2018 | Pal | G06F 16/24542 |

* cited by examiner

*Primary Examiner* — Hosain T Alam
*Assistant Examiner* — Chongsuh Park
(74) *Attorney, Agent, or Firm* — Mintz Levin Cohn Ferris Glovsky and Popeo, P.C.

(57) ABSTRACT

Described herein includes a calculation scenario of a calculation engine that efficiently partitions data for processing at separate hosts, including in parallel, and unions intermediate results from such separate processing when required for further processing. Such parallel processing of partitions can allow for faster processing times, and such unioning of data only when required for further processing can limit the transferring of data that results in slower processing.

20 Claims, 6 Drawing Sheets

PARTITION AWARE PARTIAL QUERY PROCESSING

TECHNICAL FIELD

The subject matter described herein relates to various embodiments of a calculation engine that partitions and unions data for efficient processing.

BACKGROUND

A database deployment infrastructure can be a service layer of a database management system that simplifies the deployment of database objects and other design time artifacts by providing a declarative approach for defining these design time artifacts and ensuring a consistent deployment into the database management system environment (DBMS), based on a transactional all-or-nothing deployment model and implicit dependency management. Such an approach can leverage capabilities of a modern high-speed DBMS, such as for example the HANA in-memory DBMS available from SAP SE of Walldorf, Germany, which can provide very high performance relative to disk-based approaches.

Using various customization-enabling integrated development environments (IDE), such as for example the HANA Studio available for use with the HANA IM-DBMS (available from SAP SE of Walldorf, Germany), a user may, using a group of design time artifacts, create information models, tables, landscapes, etc. on a different system or systems than that on which a DBMS is executed.

Dealing with large amounts of data can result in slow and cumbersome data processing. Partitioning data can assist with more efficiently processing such large amounts of data. For example, a data table including accounting data can have a data partition per accounting year. In distributed systems, the individual partitions can spread over the data landscape to balance the load of each host processing the data. Queries that touch more than one (including all) partitions, for example, may have to union the data in order to run the query processing on the combined data set. The union of the partitions can be hidden by a lower database layer. As a result, a lot of data may have to be transferred to a single host in order to union the data and all the processing is then performed on this single host. This can result in slow processing of the data.

SUMMARY

Systems, methods, and articles of manufacture, including computer program products, are provided for detecting a partitioning flag associated with data and processing the data based on the detected flag. In one aspect, a method may include detecting a partitioning flag and at least one set of partition attributes at a first datasource operator in a calculation scenario to be executed in a calculation engine of a database management system. The partitioning flag may provide instructions to the calculation engine regarding at least one execution scope. The execution scope can include a table. The table can be partitioned into at least one partition based on the at least one set of partition attributes. The method may include determining, based upon the detected partitioning flag, that the table is partitioned into a plurality of partitions. Each partition of the plurality of partitions can have at least one row corresponding to a same set of values of the at least one set of partition attributes. The method may include assigning, based upon the detected partitioning flag, at least one partition of the plurality of partitions to a first execution scope of the at least one execution scope and each execution scope of the at least one execution scope to a separate index server of a plurality of index servers. Each index server can run on a computing system having programmable processor. The method may include duplicating at least one operator in the calculation scenario that follows the partitioning flag to form a plurality of copies of the at least one operator. One copy of the at least one operator can be provided to each of the at least one execution scope for execution on respective index servers to generate a plurality of intermediate results for each execution scope. A second flag can be detected that indicates a union of the intermediate results and an end of the at least one partition of the plurality of partitions. The intermediate results may be unioned for further processing.

In optional variations, one or more additional features, including but not limited to the following can be included in any feasible combination. For example, the unioning of the intermediate results may include moving the intermediate results to a single index server. In other examples, the partitioning flag and the second flag may not affect semantics of the calculation scenario. In some examples, the operations may further include identifying an index server location for each partition.

In optional variations, the partitioning flag instructions may include whether the at least one execution scope is allowed to be processed on separate index servers. In other examples, the operations may further include processing the unioned intermediate results according to a subsequent operator. The subsequent operator may require the unioned intermediate results in order to properly execute. In some variations, each execution scope of the at least one execution scope that is assigned to the separate index server is a copy of the first execution scope.

Systems and methods consistent with this approach are described as well as articles that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Aspects of the current subject matter include a calculation scenario of a calculation engine that efficiently partitions data (e.g., into table partitions) for processing at separate hosts (e.g., index servers), including in parallel, and unions intermediate results from such separate processing when required for further processing. Such parallel processing of partitions can allow for faster processing times, and such unioning of data only when required for further processing can limit the transferring of data that results in slower processing. Furthermore, the partitioning of the data (e.g., data table) can be done according to partitions defined in the data and/or the partitioning can be determined during runtime (e.g., "on the fly"). For example, the data can be partitioned according to a number of hosts available for processing the partitions.

For example, some embodiments of the current subject matter include partitioning a table at runtime based on a detected first indicator associated with the table. The first indicator can be associated with the table at design time of the calculation scenario to indicate that if the table is partitioned, the table partitions are to be processed in parallel. The table partitions can be processed in parallel by separate hosts (e.g., processors, computers), thereby allowing for faster processing of the data contained in the table.

The table partitions (or intermediate results) can be unioned for further processing when a second indicator associated with the calculation scenario is detected. Such second indicator can be included in the calculation scenario during design time of the calculation scenario. The unioning of the table partitions allows for subsequent processing (e.g., calculation operations) of all of the data contained in the table (or all intermediate results) at a single processor. For example, the second indicator can be included in a calculation scenario prior to a processing step that requires all of the data contained in the table to be analyzed. Thus the first indicator allows for efficient identification of large blocks of data (e.g., data table) that can be partitioned for processing (including parallel processing) of small blocks of data thereby allowing for faster processing of data. In addition, the second indicator can allow for efficient identification of a subsequent processing step (e.g., calculation operation) where all of the data contained in the table (or all intermediate results) is needed for completing the subsequent processing step. As such, the current subject matter reduces unnecessary transferring of data while also improving processing times.

The current subject matter includes the use of various annotations (e.g., flags), including union operators and/or table datasource operators, during design time of a calculation scenario. Such union operator and/or table datasource operators can be executed during runtime per data partition without changing the semantics of a calculation scenario of the calculation engine. For example, parallel processing of the partitions can be done without changing the semantics of the calculation scenario. The table datasource operator and at least one following (including all) operators can be duplicated per partition. The union operator can unite one or more intermediate results from each partition (e.g., after detection of a second flag), such as onto a single computing system. Further operations can be modelled on top of the union operator and may not be parallelized. This can enable best possible response times and system utilization, such as for the distributed HANA database systems.

During execution plan generation, the number of partitions can be determined and the operators per partition can be added to the execution plan. To avoid unnecessary data transfer between hosts, the host location of each individual partition can be considered when the execution plan is created. This can allow operations beginning from the table datasource to the union operator being scheduled for execution on a host where the partition is physically located and/or the table is stored. For the union, the location does not matter since data has to be transferred anyway from all hosts to one host.

If a calculation scenario has a partitioned table as input, it may be possible to perform at least a part of the operations in parallel on different index servers for each separate partition or for groups of each of the partitions. The resulting tables may be later unioned into a single table after processing of the parallel operations. The calculation scenario can increase performance due at least in part to the parallel processing. Such a calculations scenario can help to reduce the amount of data that is transferred among the index servers, reducing processing time and/or increasing efficiency of the processing of the operations.

In some scenarios, the input table may not be physically partitioned and/or may include a portion that is not physically partitioned. Instead, the input table may define a logically partitioned table and/or include a portion that defines the logically partitioned table. The logically partitioned table can include a table data source calculation node, which may reference any table (e.g., any table that includes stored columns and rows that may or may not be partitioned). The table may be flagged for partitioned execution, as explained below. The input table can define a set of attributes that indicate how the operations should be logically partitioned.

In calculation scenarios that do not include a partitioned input table, and/or a portion of the input table that is not partitioned, the input table and/or the portion of the input table can be logically partitioned. The table can be logically partitioned by defining a set of partition attributes, so that rows containing a distinct value for each set of attributes constitute a distinct logical partition. For example, the partition attributes can be used to logically partition the table. A distinct logical partition can be generated for each possible distinct value of the partition attributes.

Figure 1:
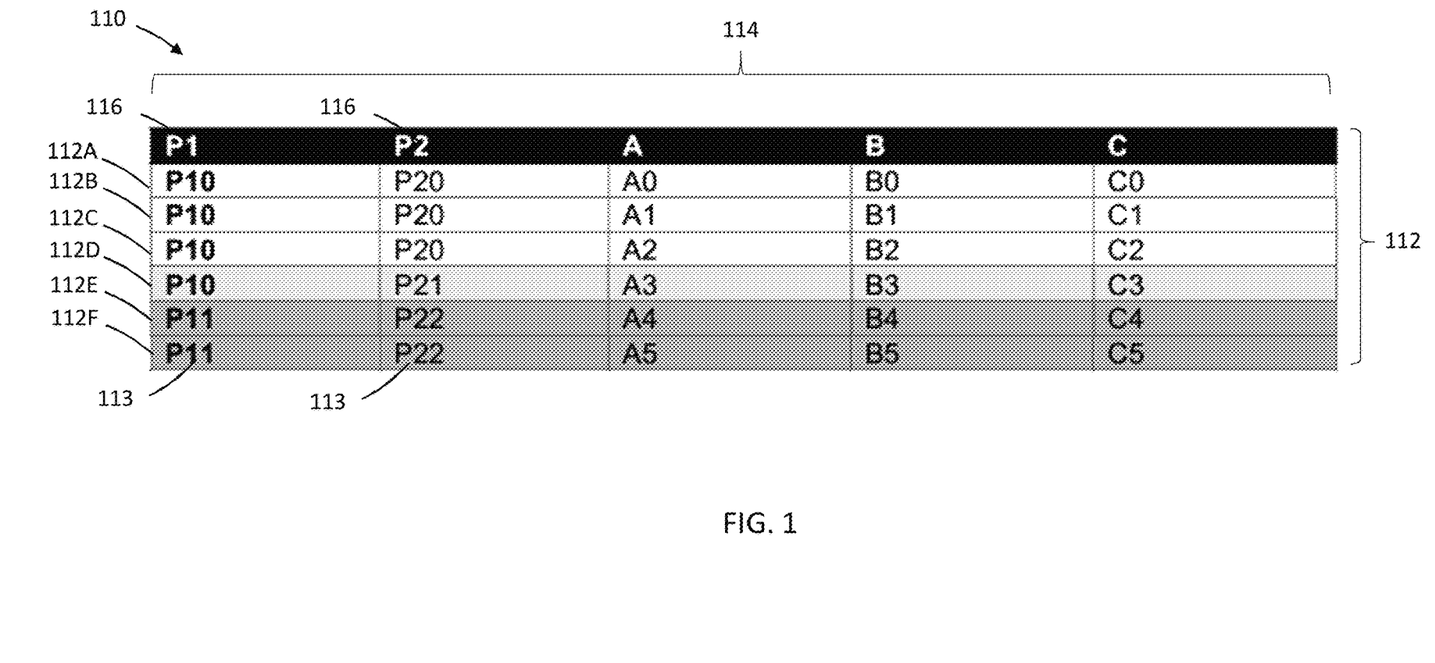
FIG. 1 shows an embodiment of a logically partitioned table consistent with implementations of the current subject matter.

FIG. 1 shows an example diagram illustrating an embodiment of at least one datasource operator or table 110. The table 110 can include a plurality of rows 112 and columns 114. Each of the rows 112 can define a datasource. Each of the columns can represent a partition attribute and can include a distinct value. In some implementations, some of the columns 114 can represent partition attributes and some of the columns 114 can represent a set of data. In some implementations, the columns 114 representing partition attributes can include a distinct value 113 and/or a set of distinct values 113 (e.g., the distinct values can include P10; P11; P20; P21; and/or P22; the sets of distinct values can include P10, P20; P10, P21; and/or P11, P22).

The table 110 can be logically partitioned according to one or more columns 114 representing partition attributes 116. As shown in the table 110, examples of the partition attributes 116 can include "P1" and "P2". The partition attributes 116 can be selected by the operator, randomly automatically chosen, and/or the like. In some implementations, as explained below, one or more of the rows 112 that correspond to a distinct logical partition can be extracted using a filter operation. At least a part of the operations of the calculation scenario 100 can be performed in parallel for each logical partition.

As shown in FIG. 1, a filter operation 150 (see, e.g., FIG. 3) has been applied to the input table 110 so that one or more rows 112 that correspond to a distinct logical partition have been grouped together according to a certain set of partition attributes 116 (including one or more partition attributes). In some implementations, if the execution scope is a logically partitioned table, as explained below, a projection node can be added as an output to the logical partition execution table. The projection node can contain a filter operation 150 that selects all rows corresponding to a distinct value and/or a set of distinct values for each set of partition attributes.

In the table 110, certain rows 112 have been shaded with different colors. Each of the colors can represent a distinct logical partition. For example, the rows 112 can include a first row 112A, a second row 112B, a third row 112C, a fourth row 112D, a fifth row 112E, and/or a sixth row 112F, among other rows 112. The first row 112A, the second row 112B, and the third row 112C can include data that is partitioned for operations on a first index server. The fourth row 112D can include data that is partitioned for operations on a second index server. The fifth row 112E and the sixth row 112F can include data that is partitioned for operations on a third index server.

To allow partitioned execution, the calculation scenario can be modeled so that at least one execution scope is present. An execution scope can include a set of all nodes in all possible paths leading from a partitioned execution union (e.g., a union data source calculation node which is flagged for partitioned execution) to all corresponding partitioned execution tables. The partitioned execution union corresponds to zero or one execution scope, such as a physical execution scope (e.g., an execution scope including a physical partitioned execution table data source) and a logical execution scope (e.g., an execution scope including a logical partitioned execution table data source). In some implementations, partitioned tables can be localized by corresponding union and table data source nodes, which can be marked with a flag.

Figure 2:
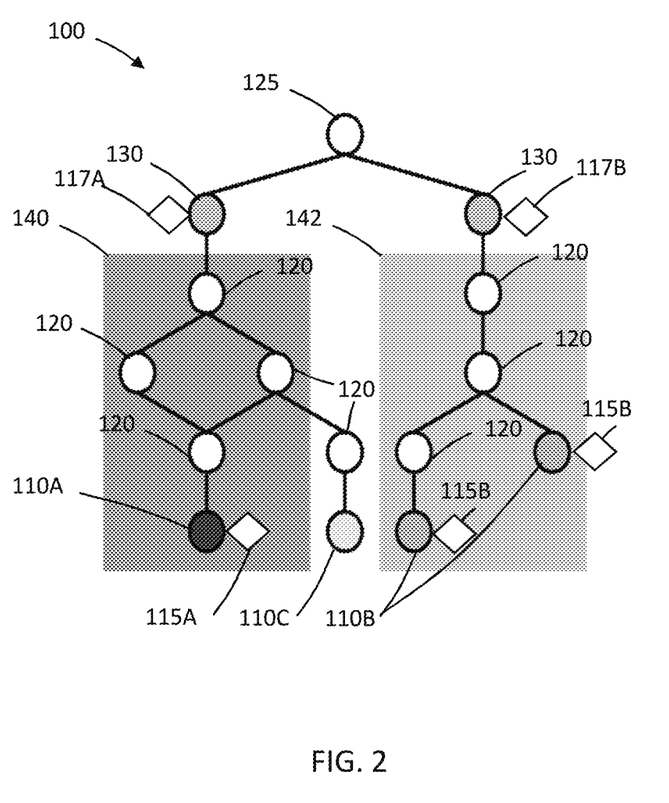
FIG. 2 shows a diagram illustrating an embodiment of a calculation scenario at design time including a table of an execution scope that is flagged for partitioning and a second flag that signals the union of intermediate results from processing of execution scope partitions at separate hosts.

FIG. 2 shows a diagram illustrating an embodiment of a calculation scenario 100 at design time including at least one execution scope, such as at least one physical execution scope 140 and at least one logical execution scope 142. Each of the execution scopes can include at least one datasource operator or table 110. For example the at least one physical execution scope 140 can include a physically partitioned table 110A and the logical execution scope 142 can include at least one logically partitioned table 110B.

In some implementations, the at least one physical execution scope 140, the logical execution scope 142, the at least one physically partitioned table 110A, and/or the at least one logically partitioned table 110B can be flagged (shown as first flags 115A, 115B) for partitioning and second flags 117A, 117B (e.g., at processing step 130) that signals the union of table partitions and/or execution scopes, such as before further processing. Between the first flags 115A, 115B and the second flags 117A, 117B, respectively, the calculation scenario 100 can include one or more first operations 120 (e.g., calculation operations) that can be performed on parts of the table, such as on one or more table partitions in each of the at least one physical execution scope 140 and/or the logical execution scope 142. As shown in FIG. 2, in some implementations, the data contained within the physical execution scope 140 can be processed via first operations 120 together with and/or separate from data contained within a non-partitioned data source or table 110C. As such, the first operations 120 do not require all of the data contained in the table or tables described herein in order to perform associated operations. Furthermore, parallel processing of each table partition and/or each execution scope can be performed using the first operations 120.

As mentioned above, the execution scope can include one or more datasource operators or tables 110. For example, each of the execution scopes can include the physically partitioned table 110A or at least one logically partitioned table 110B. In some implementations, each execution scope can include only one physically partitioned table 110A, but may not include a logically partitioned table 110B. In some implementations, each execution scope can include at least one logically partitioned table 110B, but may not include a physically partitioned table 110A.

In implementations in which the execution scope includes at least one logically partitioned table 110B, each of the logically partitioned table datasources (or rows) of the logically partitioned tables 110B can include a same set of partition attributes and the same set of distinct values (for each set of partition attributes), as mentioned above.

As shown in FIG. 2, the calculation scenario 100 can include at least one union operator and/or processing step 130 including the second flag 117 that signals the union of the processed table partitions. The union operator can include a single input for each partition and/or execution scope. For example, the physical execution scope 140 can include a physically partitioned execution union operator 130A and/or the logical execution scope 142 can include a logically partitioned execution union operator 130B. In some implementations, the physically partitioned execution union operator 130A and the logically partitioned execution union operator 130B include the same processes and/or are the same union operator 130.

At this stage, intermediate results 120 of the processed table partitions or execution scopes (such as within a physical and/or logical execution scope or between at least one physical execution scope and at least one logical execution scope) are unioned before further processing is performed. Such flagging for unioning can be inserted in the calculation scenario 100 prior to a second operation (e.g., calculation operation 125) that requires processing of all of the data contained in the table, tables, execution scope, execution scopes, or all intermediate results at a single host.

The number and type of operations included in the calculation scenario can vary. For example, some operations, including calculation operations, can include joins and unions. Furthermore, the number and type of flags or indicators used to identify partitioning and unioning of data within a calculation scenario can vary and are not limited to the examples disclosed herein. For example, a flag can include specific directions for joining more than one table or execution scope and creating a view of the joined tables and/or joined execution scopes. In addition, the number of partitions in a table, tables, and/or execution scopes and the way in which a table, tables, and/or execution scopes is partitioned and/or how partitions are unioned can vary and are not limited to the examples disclosed herein.

Figure 3:
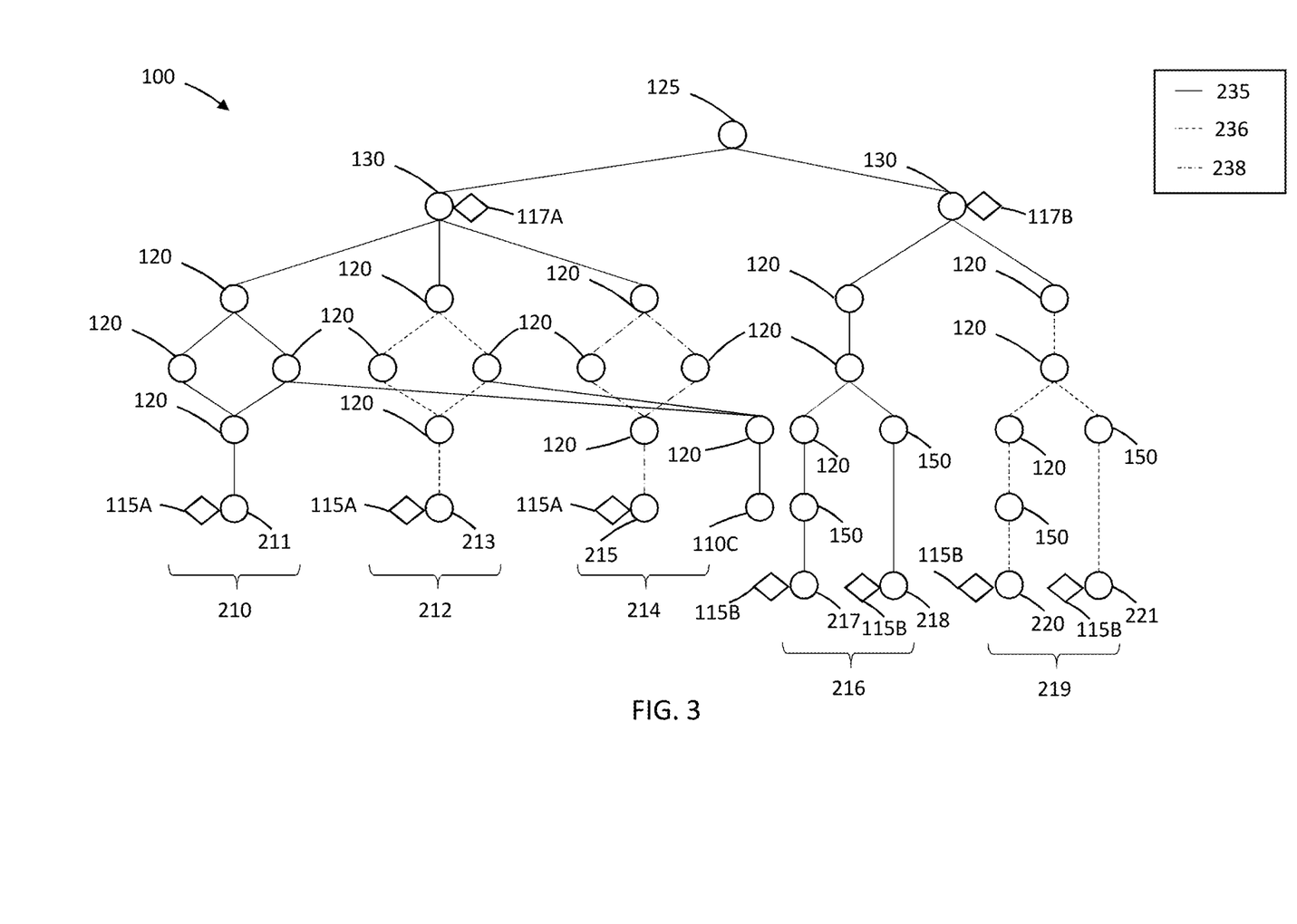
FIG. 3 shows a diagram illustrating an embodiment of a runtime scenario of the calculation scenario shown in FIG. 2 including the partitioning of the table into first, second, and third physical parts on physical execution scopes and a first, second, third, and fourth logical parts on logical execution scopes, as well as unioning intermediate results for the processing of the table partitions before a final operation is performed.

FIG. 3 shows a diagram illustrating an embodiment of runtime operations 200 of the calculation scenario 100 illustrated in FIG. 2. The physical execution scope 140 and/or the logical execution scope 142 can include a table that is partitioned into at least one physical part or partition (e.g., a physical partition execution table that references the table 110, 110A, and/or 110B) and/or at least one logical part or partition (e.g., a logical partition execution table that references the table 110, 110A, and/or 110B).

As shown in FIG. 3, the physical execution scope 140 includes a table that has been partitioned into a first physical part 210 including a first physically partitioned table part 211, a second physical part 212 including a second physically partitioned table part 213, and a third physical part 214 including a third physically partitioned table part 215. The logical execution scope 142 includes a table that has been partitioned into a first logical part 216 including a first logically partitioned table part 217 and a second logically partitioned table part 218, and a second logical part 219 including a third logically partitioned table part 220 and a fourth logically partitioned table part 221.

In some implementations, the first physical part 210, the second physical part 212, the third physical part 214, the first logical part 216, and/or the second logical part 219 can be processed in parallel. As shown, the first physically partitioned table part 211, the second physically partitioned table part 213, the third physically partitioned table part 215, and/or the non-partitioned table 110C can be processed on separate hosts. In some implementations, the non-partitioned table 110C can be processed on the same host as the first physically partitioned table part 211, the second physically partitioned table part 213, and/or the third physically partitioned table part 215. In the example shown in FIG. 3, the non-partitioned table 110C is processed on the same host as the first physically partitioned table part 211.

In some implementations, the first logically partitioned table part 217, the second logically partitioned table part 218, the third logically partitioned table part 220, and/or the fourth logically partitioned table part 221 can be processed on the same and/or separate hosts. For example, as shown in FIG. 3, the first and second logically partitioned table parts 217, 218 can be processed on a host that is separate from a host that processes the third and fourth logically partitioned table parts 220, 221.

As mentioned above, each of the first physical part 210, the second physical part 212, the third physical part 214, the first logical part 216, and/or the second logical part 219 can be processed in parallel on separate hosts. In some implementations, at least one of the logical parts can be processed on the same host as one of the physical parts. For example, the first logical part 216 can be processed by the same host as the first physical part 210. The second logical part 219 can be processed by the same host as the second physical part 212. Other configurations and combinations are contemplated.

In some examples, the first operations 120, which reside between the first flags 115A, 115B and the second flags 117A, 117B (as shown in FIG. 2) can be processed on a first host 235 along with the first physical table part 210 and/or the first logical table part 216. In such configurations, the first host 235 may be the same host that initially stored each of the first physical part 210, the second physical part 212, the third physical part 214, the first logical part 216, and/or the second logical part 219. The first operations can be copied over from the first host 235, along with the second physical table part 212 to be processed on a separate host (e.g., a second host 236) and/or the first operations 120 can be copied over from the first host 235 along with the third physical table part 214 to be processed on a separate host (e.g., a third host 238). In some implementations, the first operations 120 can be copied over from the first host 235, along with the second logical table part 219 to be processed on a separate host (e.g., the second host 236). As such, the first operations 120 can be applied to the first table part 210 on a first host 235 and the first operations 120 can be applied to the second table part 212 on a second host 237. This allows for parallel and faster processing of the first, second, and third physical parts 210, 212, 214, and/or the first and second logical parts 216, 219 thereby resulting in faster processing of the table 110 or tables 110A, 110B as a whole.

The first, second, and third physical parts 210, 212, 214, and/or the first and second logical parts 216, 219 and/or their intermediate results from processing can be unioned at the union operator or processing step 230 (which was flagged with the second flags 117, 117B, as shown in FIG. 2). This can allow the second operation 225, which may require all of the data from the table 110 and/or intermediate results, to process the data from first, second, and third physical parts 210, 212, 214, and/or the first and second logical parts 216, 219 at the same host (e.g., the first host 235). As such, data is transferred between hosts only when necessary thereby improving processing efficiency and time.

Figure 4:
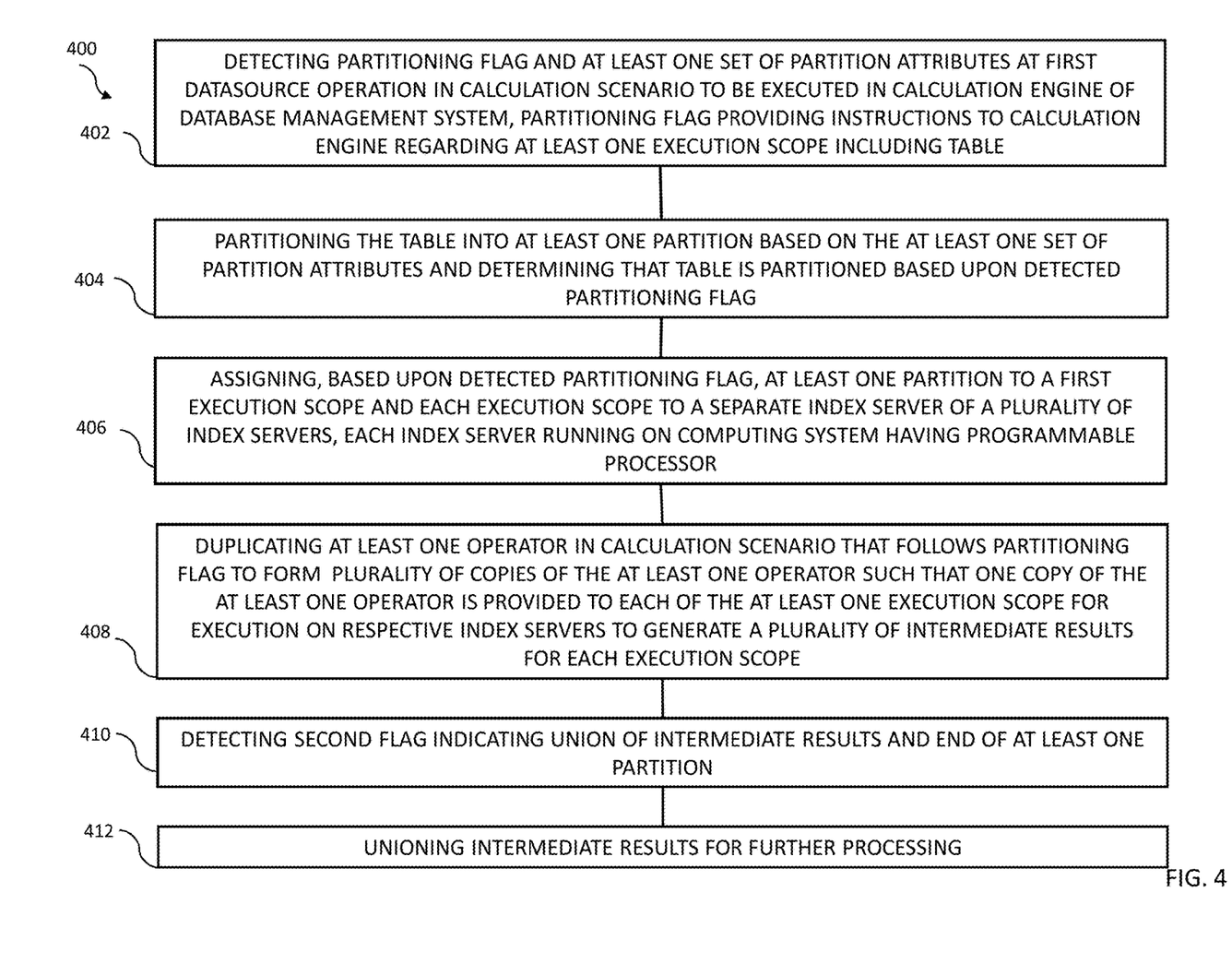
FIG. 4 shows a process flow diagram illustrating aspects of a method having one or more features consistent with implementations of the current subject matter.

FIG. 4 shows a process flow chart 400 illustrating features of a method consistent with one or more implementations of the current subject matter. It will be understood that other implementations may include or exclude certain features.

At 402, a partitioning flag and/or at least one set of partition attributes can be detected at a first datasource operation in a calculation scenario to be executed in a calculation engine of a database management system. The partitioning flag can provide instructions to the calculation scenario regarding a table and/or at least one execution scope. For example, the partitioning flag instructions can include whether the plurality of partitions are allowed to be processed on the same and/or separate index servers having computing systems. The at least one execution scope can include a table.

At 404, the table can be partitioned into at least one partition, such as at least one physically partitioned table part and/or at least one logically partitioned table part. The table can be partitioned based on the at least one set of partition attributes. Based upon the detected partitioning flag, it can be determined that the table called by the datasource operator is partitioned into at least one partition. Each partition can have at least one row corresponding to a same set of values of the at least one set of partition attributes. In some implementations, each row of each partition has the same set of values of the at least one set of partition attributes.

In some implementations, the number of partitions for the execution scope can be determined. If the table includes a physical partition, the table can be partitioned into the number of physical partitions referenced by the physical partition execution table. As mentioned above, each physical partition referenced by the physical partition execution table can be processed on a separate index server. If the table includes a logical partition, the table can be partitioned into the number of sets of distinct values for each of the sets of partition attributes referenced by the logical partition execution table. As mentioned above, each logical partition having the same set of distinct values for each set of partition attributes can be processed on the same index server.

In some implementations, if the number of partitioned parts is greater than one, the execution scope can be duplicated for each partitioned part in addition to the first partitioned part. A new input may be added to the partitioned execution union for each duplicated execution scope. If a node in the duplicated execution scope has an input node that is not part of the execution scope (e.g., the non-partitioned table), a new output can be added to the input node for each duplicated execution scope. In some implementations, if the execution scope includes a physically partitioned table part, the table referenced by the physical partitioned execution table can be adjusted to include the relevant part index, so that only rows associated with that execution scope are retrieved. In some implementations, if the execution scope includes a logically partitioned table part, a projection node can be added as an output to the logical partition execution table. The projection node can contain a filter that selects all rows corresponding to the distinct value and/or set of distinct values for each set of partition attributes.

In some implementations, the names of the nodes in the original and duplicated execution scopes can be adjusted by adding a suffix. The suffix can help to avoid ambiguities when referencing nodes. For example, the name can include the following format to help to minimize the possibility of the same referenced name being used: <Original Node Name>_PartId_<Part Number>_<Generated Unique ID>. The generated unique ID can be identical for each node in a duplicated execution scope.

At 406, based upon the detected partitioning flag, each partition of the at least one partition can be assigned to at least a first execution scope of the at least one execution scope, and each execution scope can be assigned to an index server of a plurality of index servers. For example, each physical execution scope of the at least one execution scope can be assigned to a separate index server of a plurality of index servers. Each logical execution scope of the at least one execution scope can be assigned to at least one of the separate index servers of the plurality of index servers. In some implementations, the same index server can process a physical execution scope and at least one logical execution scope. In some implementations, each of the index servers runs on a computing system having a programmable processor. In some implementations, for example, a computing system location for each of the plurality of partitions can be identified.

In some implementations, if the execution scope is a physical execution scope, the index server is assigned to the corresponding table partition. In some implementations, it may be possible to execute all partitions on the index server where the query is running, to cycle all available index servers, and/or to cycle a set of specified index servers, among other configurations. Such processes can be performed for each specific query by setting the value of a placeholder variable. If no variable is set, all partitions may be executed by cycling all available index servers.

At 408, at least one operator is duplicated in the calculation scenario that follows the partitioning flag to form a plurality of copies of the at least one operator such that one copy of the at least one operator is provided to each execution scope of the at least one execution scope for execution on respective index servers to generate intermediate results for each partition and/or execution scope.

At 410, a second flag can be detected. The second flag can indicate a union of the intermediate results and/or an end of at least one partition. For example, the first flag and the second flag may not affect semantics of the calculation scenario.

At 412, the intermediate results can be unioned for further processing. For example, the unioning of the intermediate results can include moving the intermediate results to a single index server having a computing system.

Figure 5:
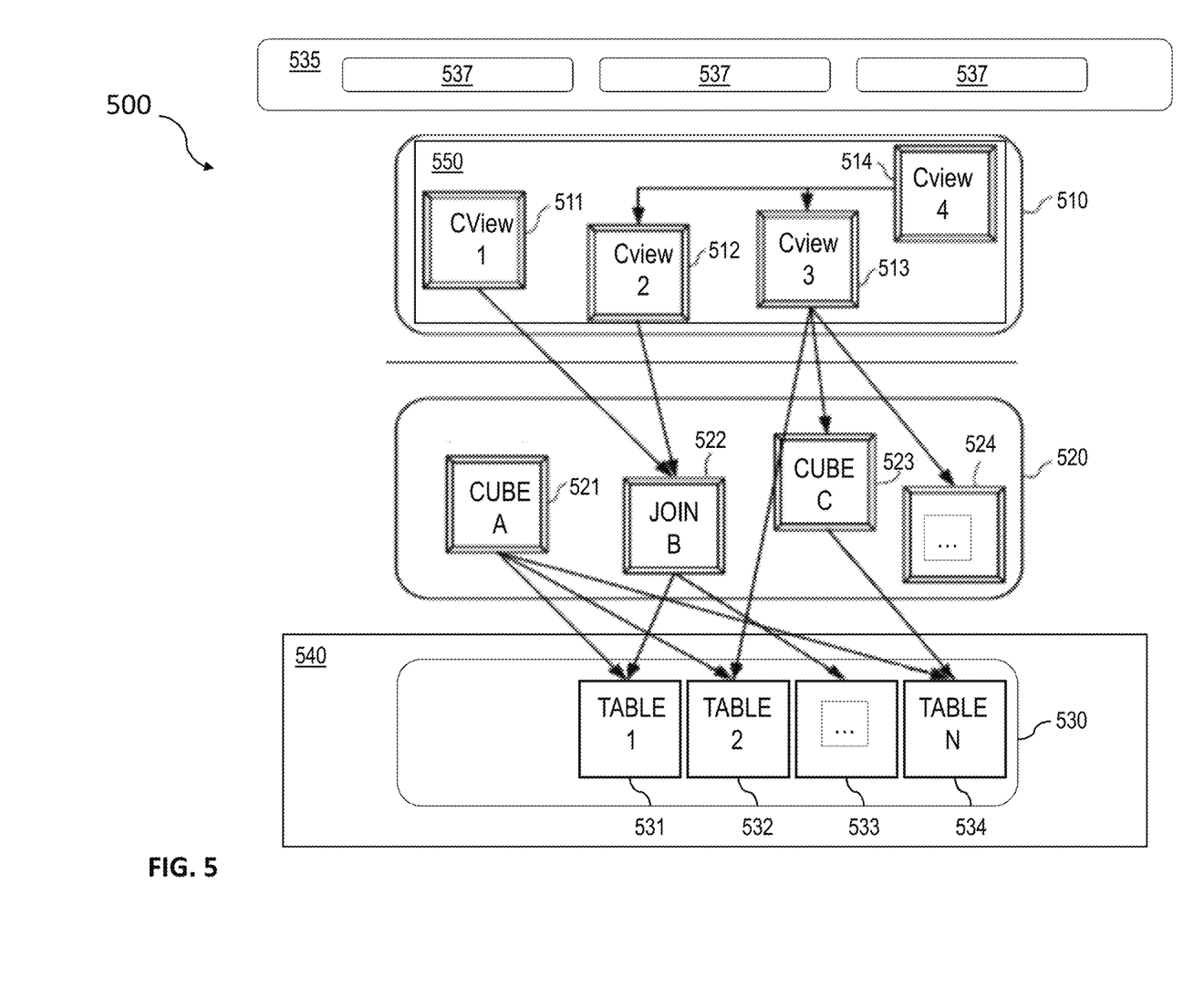
FIG. 5 shows a diagram illustrating a computing architecture consistent with implementations of the current subject matter including a database system that includes three layers: a calculation engine layer, a logical layer, and a physical table-pool.

FIG. 5 is a diagram that illustrates a computing architecture 500 including a database system that includes three layers: a calculation engine layer 510, a logical layer 520, and a physical table-pool 530. One or more application servers 535 implementing database client applications 537 can access the database system. Calculation scenarios can be executed by a calculation engine, which can form part of a database or which can be part of the calculation engine layer 510 (which is associated with the database). The calculation engine layer 510 can be based on and/or interact with the other two layers, the logical layer 520 and the physical table pool 530. The basis of the physical table pool 530 consists of physical tables (called indexes) containing the data, which can be stored on one more database servers 540. Various tables 531-534 can be joined using logical meta-models 521-524 defined by the logical layer 520 to form an index. For example, the tables 531-334 in a cube (e.g. an online analytical processing or "OLAP" index) can be assigned roles (e.g., fact or dimension tables) and joined to form a star schema. It is also possible to form join indexes (e.g. join index B 522 in FIG. 5), which can act like database views in computing environments such as the Fast Search Infrastructure (FSI) available from SAP SE of Walldorf, Germany.

As stated above, a calculation scenario 550 can include individual nodes (e.g. calculation nodes) 511-314, which in turn each define operations such as joining various physical or logical indexes and other calculation nodes (e.g., CView 4 is a join of CView 2 and CView 3). That is, the input for a node 511-514 can be one or more physical, join, or OLAP indexes or calculation nodes.

In a calculation scenario 550, two different representations can be provided, including a) a pure calculation scenario in which all possible attributes are given and b) an instantiated model that contains only the attributes requested in the query (and required for further calculations). Thus, calculation scenarios can be created that can be used for various queries. With such an arrangement, a calculation scenario 550 can be created which can be reused by multiple queries even if such queries do not require every attribute specified by the calculation scenario 550.

Every calculation scenario 550 can be uniquely identifiable by a name (e.g., the calculation scenario 550 can be a database object with a unique identifier, etc.). Accordingly, the calculation scenario 550 can be queried in a manner similar to a view in a SQL database. Thus, the query is forwarded to the calculation node 511-514 for the calculation scenario 550 that is marked as the corresponding default node. In addition, a query can be executed on a particular calculation node 511-514 (as specified in the query). Furthermore, nested calculation scenarios can be generated in which one calculation scenario 550 is used as source in another calculation scenario (e.g. via a calculation node 511-514 in this calculation scenario 550). Each calculation node 511-514 can have one or more output tables. One output table can be consumed by several calculation nodes 511-514.

Figure 6:
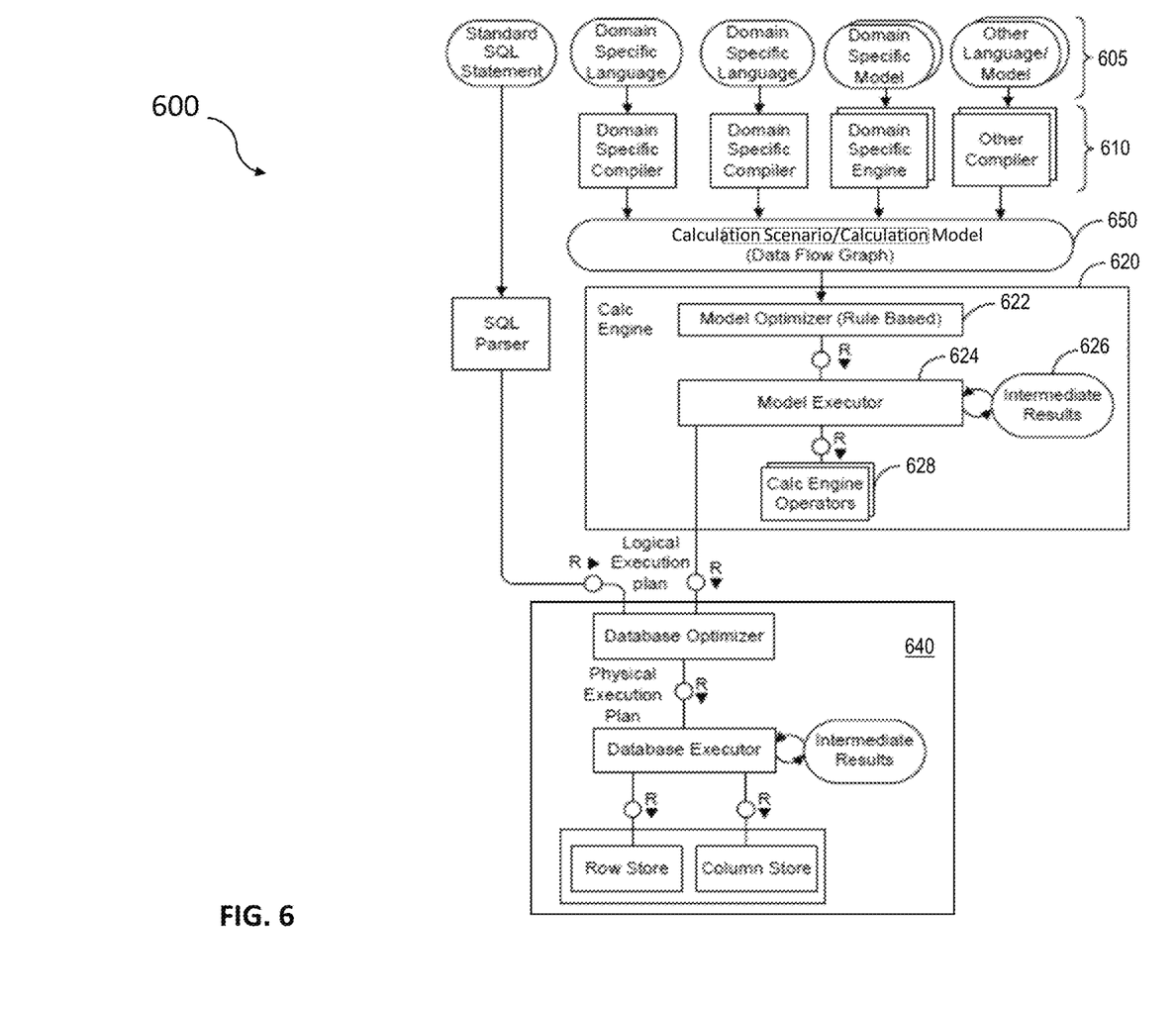
FIG. 6 shows a diagram illustrating a sample architecture for request processing and execution control consistent with implementations of the current subject matter.

FIG. 6 is a diagram 600 illustrating a sample architecture for request processing and execution control. As shown in FIG. 6, artifacts 605 in different domain specific languages can be translated by their specific compilers 610 into a common representation called a "calculation scenario" 650 (which is also referred to in in FIG. 6 as a calculation model). To achieve enhanced performance, the models and programs written in these languages are executed inside the database server 640. This arrangement eliminates the need to transfer large amounts of data between the database server 640 and a client application 537, which can be executed by an application server 535. Once the different artifacts 605 are compiled into this calculation scenario, they can be processed and executed in the same manner. A calculation engine 620 executes the calculation scenarios 650.

A calculation scenario 650 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table valued parameters (i.e., user-defined table types that are passed into a procedure or function and that provide an efficient way to pass multiple rows of data to a client application 537 at the application server 535). Inputs can be connected to tables or to the outputs of other nodes. A calculation scenario 650 can support a variety of node types such as (i) nodes for set operations such as projection, aggregation, join, union, minus, intersection, and (ii) SQL nodes that execute a SQL statement which is an attribute of the node. In addition, to enable parallel execution, a calculation scenario 650 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 650 can be defined as part of database metadata and invoked multiple times. A calculation view can be created, for example, by a SQL statement "CREATE COLUMN VIEW <schema>.<viewName> TYPE CALCULATION WITH PARAMETERS". Once a calculation view is created it can be queried (e.g., "SELECT FROM <calcview_name>", etc.). In some cases, databases can have pre-defined calculation scenarios 650 (default, previously defined by users, etc.). Calculation scenarios 650 can be persisted in a repository (coupled to the database server 640) or in transient scenarios. Calculation scenarios 650 can also be kept in-memory.

Calculation scenarios 650 are more powerful than traditional SQL queries or SQL views for many reasons. One reason is the possibility to define parameterized calculation schemas that are specialized when the actual query is issued. Unlike a SQL view, a calculation scenario 650 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 650 may contain an aggregation node containing all attributes. Later, the attributes for grouping can be supplied with the query. This allows having a predefined generic aggregation, with the actual aggregation dimensions supplied at invocation time. The calculation engine 620 can use the actual parameters, attribute list, grouping attributes, and the like supplied with the invocation to instantiate a query specific calculation scenario 650. This instantiated calculation scenario 650 is optimized for the actual query and does not contain attributes, nodes or data flows that are not needed for the specific invocation.

When the calculation engine 620 gets a request to execute a calculation scenario 650, it can first optimize the calculation scenario 650 using a rule based model optimizer 622. Examples for optimizations performed by the model optimizer can include "pushing down" filters and projections so that intermediate results 626 are narrowed down earlier, or the combination of multiple aggregation and join operations into one node. The optimized model can then be executed by a calculation engine model executor 624 (a similar or the same model executor can be used by the database directly in some cases). This includes decisions about parallel execution of operations in the calculation scenario 650. The model executor 624 can invoke the required operators (using, for example, a calculation engine operators module 628) and manage intermediate results. Most of the operators are executed directly in the calculation engine 620 (e.g., creating the union of several intermediate results). The remaining nodes of the calculation scenario 650 (not implemented in the calculation engine 620) can be transformed by the model executor 624 into a set of logical database execution plans. Multiple set operation nodes can be combined into one logical database execution plan if possible.

The calculation scenarios 650 of the calculation engine 620 can be exposed as a special type of database views called calculation views. That means a calculation view can be used in SQL queries and calculation views can be combined with tables and standard views using joins and sub queries. When such a query is executed, the database executor inside the SQL processor needs to invoke the calculation engine 620 to execute the calculation scenario 650 behind the calculation view. In some implementations, the calculation engine 620 and the SQL processor are calling each other: on one hand the calculation engine 620 invokes the SQL processor for executing set operations and SQL nodes and, on the other hand, the SQL processor invokes the calculation engine 620 when executing SQL queries with calculation views.

The attributes of the incoming datasets utilized by the rules of model optimizer 622 can additionally or alternatively be based on an estimated and/or actual amount of memory consumed by the dataset, a number of rows and/or columns in the dataset, and the number of cell values for the dataset, and the like.

A calculation scenario 650 as described herein can include a type of node referred to herein as a semantic node (or sometimes semantic root node). A database modeler can flag the root node (output) in a graphical calculation view to which the queries of the database applications directed as semantic node. This arrangement allows the calculation engine 620 to easily identify those queries and to thereby provide a proper handling of the query in all cases.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A system comprising:
   at least one programmable processor; and
   machine-readable memory storing instructions, which when executed by the at least one processor cause the at least one programmable processor to perform operations comprising:
   detecting a partitioning flag and at least one set of partition attributes at a first datasource operator in a calculation scenario to be executed in a calculation engine of a database management system, the partitioning flag providing instructions to the calculation engine regarding at least one execution scope, the at least one execution scope including a table;
   partitioning the table into at least one partition based on the at least one set of partition attributes, the partitioning comprising determining, based on the execution scope, to partition the table into a plurality of logical partitions and a plurality of physical partitions;
   determining, based upon the detected partitioning flag, that the table is partitioned into a plurality of partitions, each partition of the plurality of partitions having at least one row corresponding to a same set of values of the at least one set of partition attributes, wherein the plurality of partitions comprises the plurality of logical partitions and the plurality of physical partitions;

assigning, based upon the detected partitioning flag, a first physical partition of the plurality of physical partitions to a first execution scope of the at least one execution scope, a second physical partition of the plurality of physical partitions to a second execution scope of the at least one execution scope, the first execution scope to a first index server, and the second execution scope to a second index server, the second index server being separate from the first index server, each of the first index server and the second index server running on a computing system having a programmable processor;

assigning, based upon the detected partitioning flag, a logical partition of the plurality of logical partitions to a third execution scope, and the third execution scope to the first index server;

duplicating at least one operator in the calculation scenario that follows the partitioning flag to form a plurality of copies of the at least one operator such that one copy of the at least one operator is provided to each of the at least one execution scope for execution on respective index servers to generate a plurality of intermediate results for each execution scope;

generating the plurality of intermediate results for each execution scope;

detecting, during the generation of the plurality of intermediate results for each execution scope, a second flag indicating a union of the intermediate results and an end of the at least one partition of the plurality of partitions, the second flag comprising instructions to union the plurality of intermediate results; and unioning, based on the detection of the second flag, the plurality of intermediate results for further processing.

2. The system of claim 1, wherein the unioning of the plurality of intermediate results comprises moving the intermediate results to a single index server.

3. The system of claim 1, wherein the partitioning flag and the second flag do not affect semantics of the calculation scenario.

4. The system of claim 1, where the operations further comprise identifying an index server location for each of the at least one partition of the plurality of partitions.

5. The system of claim 1, wherein the partitioning flag instructions include whether the at least one execution scope is allowed to be processed on separate index servers.

6. The system of claim 1, wherein the operations further comprise processing the unioned intermediate results according to a subsequent operator, the subsequent operator requiring the unioned intermediate results in order to properly execute.

7. The system of claim 1, wherein each execution scope of the at least one execution scope that is assigned to the first index server and the second index server is a copy of the first execution scope.

8. A computer-implemented method, comprising:
detecting a partitioning flag and at least one set of partition attributes at a first datasource operator in a calculation scenario to be executed in a calculation engine of a database management system, the partitioning flag providing instructions to the calculation engine regarding at least one execution scope, the execution scope including a table;
partitioning the table into at least one partition based on the at least one set of partition attributes, the partitioning comprising determining, based on the execution scope, to partition the table into a plurality of logical partitions and a plurality of physical partitions;
determining, based upon the detected partitioning flag, that the table is partitioned into a plurality of partitions, each partition of the plurality of partitions having at least one row corresponding to a same set of values of the at least one set of partition attributes, wherein the plurality of partitions comprises the plurality of logical partitions and the plurality of physical partitions;
assigning, based upon the detected partitioning flag, a first physical partition of the plurality of physical partitions to a first execution scope of the at least one execution scope, a second physical partition of the plurality of physical partitions to a second execution scope of the at least one execution scope, the first execution scope to a first index server, and the second execution scope to a second index server, the second index server being separate from the first index server, each of the first index server and the second index server running on a computing system having a programmable processor;
assigning, based upon the detected partitioning flag, a logical partition of the plurality of logical partitions to a third execution scope, and the third execution scope to the first index server;
duplicating at least one operator in the calculation scenario that follows the partitioning flag to form a plurality of copies of the at least one operator such that one copy of the at least one operator is provided to each of the at least one execution scope for execution on respective index servers to generate a plurality of intermediate results for each execution scope;
generating the plurality of intermediate results for each execution scope;
detecting, during the generation of the plurality of intermediate results for each execution scope, a second flag indicating a union of the intermediate results and an end of the at least one partition of the plurality of partitions, the second flag comprising instructions to union the plurality of intermediate results; and
unioning, based on the detection of the second flag, the plurality of intermediate results for further processing.

9. The method of claim 8, wherein the unioning of the plurality of intermediate results comprises moving the intermediate results to a single index server.

10. The method of claim 8, wherein the partitioning flag and the second flag do not affect semantics of the calculation scenario.

11. The method of claim 8, further comprising identifying an index server location for each of the at least one partition of the plurality of partitions.

12. The method of claim 8, wherein the partitioning flag instructions include whether the at least one execution scope is allowed to be processed on separate index servers.

13. The method of claim 8, further comprising processing the unioned intermediate results according to a subsequent operator, the subsequent operator requiring the unioned intermediate results in order to properly execute.

14. The method of claim 8, wherein each execution scope of the at least one execution scope that is assigned to the first index server and the second index server is a copy of the first execution scope.

15. A non-transitory computer-readable medium storing instructions, which when executed by at least one data processor, result in operations comprising:
detecting a partitioning flag and at least one set of partition attributes at a first datasource operator in a calculation scenario to be executed in a calculation engine of a database management system, the partitioning flag providing instructions to the calculation engine regarding at least one execution scope, the execution scope including a table;

partitioning the table into at least one partition based on the at least one set of partition attributes, the partitioning comprising determining, based on the execution scope, to partition the table into a plurality of logical partitions and a plurality of physical partitions;

determining, based upon the detected partitioning flag, that the table is partitioned into a plurality of partitions, each partition of the plurality of partitions having at least one row corresponding to a same set of values of the at least one set of partition attributes, wherein the plurality of partitions comprises the plurality of logical partitions and the plurality of physical partitions;

assigning, based upon the detected partitioning flag, a first physical partition of the plurality of physical partitions to a first execution scope of the at least one execution scope, a second physical partition of the plurality of physical partitions to a second execution scope of the at least one execution scope, the first execution scope to a first index server, and the second execution scope to a second index server, the second index server being separate from the first index server, each of the first index server and the second index server running on a computing system having a programmable processor;

assigning, based upon the detected partitioning flag, a logical partition of the plurality of logical partitions to a third execution scope, and the third execution scope to the first index server;

duplicating at least one operator in the calculation scenario that follows the partitioning flag to form a plurality of copies of the at least one operator such that one copy of the at least one operator is provided to each of the at least one execution scope for execution on respective index servers to generate a plurality of intermediate results for each execution scope;

generating the plurality of intermediate results for each execution scope;

detecting, during the generation of the plurality of intermediate results for each execution scope, a second flag indicating a union of the intermediate results and an end of the at least one partition of the plurality of partitions, the second flag comprising instructions to union the plurality of intermediate results; and unioning, based on the detection of the second flag, the plurality of intermediate results for further processing.

16. The non-transitory computer-readable medium of claim 15, wherein the unioning of the plurality of intermediate results comprises moving the intermediate results to a single index server.

17. The non-transitory computer-readable medium of claim 15, wherein the partitioning flag and the second flag do not affect semantics of the calculation scenario.

18. The non-transitory computer-readable medium of claim 15, wherein the operations further comprises identifying an index server location for each of the at least one partition of the plurality of partitions.

19. The non-transitory computer-readable medium of claim 15, wherein the partitioning flag instructions include whether the at least one execution scope is allowed to be processed on separate index servers.

20. The system of claim 1, further comprising:

assigning, based upon the detected partitioning flag, a third physical partition of the plurality of physical partitions to a fourth execution scope of the at least one execution scope, and the fourth execution scope to a third index server running on the computing system having a programmable processor, the third index server being separate from the first index server and the second index server; and assigning, based upon the detected partitioning flag, a second logical partition of the plurality of logical partitions to a fifth execution scope, and the fifth execution scope to the second index server.

* * * * *